(12) United States Patent
Figuli et al.

(10) Patent No.: US 10,732,972 B2
(45) Date of Patent: Aug. 4, 2020

(54) NON-OVERLAPPING SUBSTRING DETECTION WITHIN A DATA ELEMENT STRING

(71) Applicant: International Business Machines Corporation, Armonk, NY (US)

(72) Inventors: Razvan Peter Figuli, Remchingen (DE); Stefan Payer, Stuttgart (DE); Cedric Lichtenau, Stuttgart (DE); Petra Leber, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/109,840

(22) Filed: Aug. 23, 2018

(65) Prior Publication Data

US 2020/0065097 A1    Feb. 27, 2020

(51) Int. Cl.
*G06F 9/30* (2018.01)
*G06F 16/903* (2019.01)

(52) U.S. Cl.
CPC ...... *G06F 9/30029* (2013.01); *G06F 9/30018* (2013.01); *G06F 9/30036* (2013.01); *G06F 16/90344* (2019.01)

(58) Field of Classification Search
CPC ........ G06F 2207/025; G06F 7/00; G06F 7/02; G06F 7/026; G06F 16/90344; G06F 9/30018; G06F 9/30021; G06F 9/30029; G06F 9/30036
See application file for complete search history.

(56) References Cited

U.S. PATENT DOCUMENTS

| 4,094,001 A | 6/1978 | Miller |
| 4,907,194 A | 3/1990 | Yamada et al. |
| 4,955,056 A | 9/1990 | Stentiford |

(Continued)

FOREIGN PATENT DOCUMENTS

| CN | 101609455 A | 12/2009 |
| EP | 2680166 B1 | 10/2015 |
| WO | 2007076269 A2 | 7/2007 |

OTHER PUBLICATIONS

Karp et al., "Efficient randomized pattern-matching algorithms", IBM Journal Res. Develop., vol. 31, No. 2, Mar. 1987, pp. 249-260.

(Continued)

*Primary Examiner* — Andrew Caldwell
*Assistant Examiner* — Emily E Larocque
(74) *Attorney, Agent, or Firm* — Nathan M. Rau

(57) ABSTRACT

A number of non-overlapping instances of a substring occurring within a string of data elements can be determined through a method that includes partitioning and distributing the string to an ordered list of equal length segments that each have a length greater or equal to L. A substring match within a target segment of the ordered list of segments can be detected by sequentially comparing the substring with each segment of the ordered list of segments. It can be subsequently determined that the target segment contains additional data elements, and a new segment can be generated by clearing L−1 data elements following a position of the substring match in the target segment. An additional substring match can be detected by comparing the substring with the new segment.

20 Claims, 6 Drawing Sheets

(56) References Cited

U.S. PATENT DOCUMENTS

| | | | |
|---|---|---|---|
| 5,757,983 | A | 5/1998 | Kawaguchi et al. |
| 6,738,794 | B2 * | 5/2004 | Stein .................. G06F 7/02 |
| | | | 708/212 |
| 7,444,326 | B1 | 10/2008 | Jagadish et al. |
| 7,596,553 | B2 | 9/2009 | Meirovitz et al. |
| 7,756,847 | B2 | 7/2010 | Pauws et al. |
| 7,872,890 | B1 | 1/2011 | Starovoytov |
| 7,991,987 | B2 | 8/2011 | Cabot |
| 8,051,085 | B1 | 11/2011 | Srinivasan et al. |
| 8,296,279 | B1 | 10/2012 | Singh |
| 8,407,245 | B2 | 3/2013 | Ryan et al. |
| 8,620,968 | B2 | 12/2013 | Atasu et al. |
| 9,424,031 | B2 | 8/2016 | Thantry et al. |
| 9,460,196 | B2 | 10/2016 | Boyce |
| 10,063,474 | B2 * | 8/2018 | McGhee .................. H04L 69/22 |
| 10,169,451 | B1 | 1/2019 | Payer et al. |
| 2003/0137437 | A1 | 7/2003 | Watson |
| 2004/0010752 | A1 | 1/2004 | Chan et al. |
| 2007/0011734 | A1 | 1/2007 | Balakrishnan et al. |
| 2007/0133593 | A1 | 6/2007 | Shankara |
| 2008/0040345 | A1 | 2/2008 | Cameron |
| 2008/0050469 | A1 | 2/2008 | Kwon et al. |
| 2008/0208850 | A1 | 8/2008 | Boyce |
| 2010/0142813 | A1 | 6/2010 | Abdo et al. |
| 2010/0225506 | A1 | 9/2010 | Chen et al. |
| 2011/0252046 | A1 | 10/2011 | Szabo et al. |
| 2013/0086096 | A1 | 4/2013 | Indeck et al. |
| 2014/0095834 | A1 | 4/2014 | Kuo |
| 2014/0189320 | A1 | 7/2014 | Kuo |
| 2015/0199178 | A1 | 7/2015 | Shi et al. |
| 2015/0347532 | A1 | 12/2015 | Shaw et al. |
| 2016/0224552 | A1 | 8/2016 | Han et al. |
| 2017/0011120 | A1 | 1/2017 | Cheung et al. |
| 2017/0024439 | A1 | 1/2017 | Chavan et al. |
| 2017/0077964 | A1 | 3/2017 | Guilford et al. |
| 2017/0185465 | A1 | 6/2017 | Ould-Ahmed-Vall et al. |
| 2018/0217836 | A1 | 8/2018 | Johnson |
| 2018/0314722 | A1 | 11/2018 | Li et al. |
| 2019/0325083 | A1 | 10/2019 | Payer et al. |

OTHER PUBLICATIONS

Boyer et al., "A Fast String Searching Algorithm", Communications of the ACM, Oct. 1977, vol. 20, No. 10, pp. 762-772.

Knuth et al., "Fast Pattern Matching in Strings", Siam J. Comput., vol. 6, No. 2, Jun. 1977, 28 pages.

Intel, "Intel® SSE4 Programming Reference", Reference No. D91561-003, Jul. 2007, 197 pages.

Intel, "Intel® 64 and IA-32 Architectures Optimization Reference Manual", Order No. 248966-033, Jun. 2016, 672 pages.

Unknown, "Count Occurrences of a Substring", rosettacode.org, last modified Jan. 14, 2018, printed Mar. 8, 2018, 60 pages, https://www.rosettacode.org/wiki/Count_occurrences_of_a_substring.

Lin et al., "Non-Overlapping Subsequence Matching of Stream Synopses", IEEE Transactions on Knowledge and Data Engineering, vol. 30, No. 1, Jan. 2018, pp. 101-114.

Zhikai et al., "Fast String Matching With Overlapped Substring Classifier in Deep Packet Inspection Systems", 2010 IEEE Global Telecommunications Conference, Dec. 6-10, 2010, 6 pages.

Franek et al., "A simple fast hybrid pattern-matching algorithm", Journal of Discrete Algorithms 5 (2007), Available online Jan. 16, 2007, pp. 682-695.

Indyk, P., "Faster algorithms for string matching problems: matching the convolution bound", 39th Annual Symposium on Foundations of Computer Science, Nov. 8-11, 1998, 8 pages.

Abdeen, R., "Start-to-End Algorithm for String Searching", IJCSNS International Journal of Computer Science and Network Security, vol. 11 No. 2, Feb. 2011, pp. 179-182.

Unknown, "charmatch: Partial String Matching", Sep. 22, 2017, 26 pages.

Unknown, "Java String indexof Parsing", CodingBat code practice, Code Help and Videos, Sep. 22, 2017, 3 pages.

Lau, K., "Swift Algorithm Club: Boyer Moore String Search Algorithm", raywenderlich.com, Jun. 30, 2017, 8 pages.

Mula, W., "SIMD-friendly algorithms for substring searching", Nov. 28, 2016, Updated on Apr. 29, 2017, 16 pages.

Faro et al., "Fast Packed String Matching for Short Patterns", 2013 Proceedings of the Fifteenth Workshop on Algorithm Engineering and Experiments, pp. 113-121.

Myers, G., "A Fast Bit-Vector Algorithm for Approximate String Matching Based on Dynamic Programming", Journal of the ACM, vol. 46, No. 3, May 1999, pp. 395-415.

Figuli et al., "Rapid Substring Detection Within a Data Element String", U.S. Appl. No. 16/109,836, filed Aug. 23, 2018.

Payer et al., "Rapid Character Substring Searching", U.S. Appl. No. 15/957,984, filed Apr. 20, 2018.

Payer et al., "Rapid Partial Substring Matching", U.S. Appl. No. 15/957,989, filed Apr. 20, 2018.

IBM, List of IBM Patents or Patent Applications Treated as Related, Aug. 20, 2018, 2 pages.

Sitaridi et al., "SIMD-Accelerated Regular Expression Matching", DaMoN '16, Jun. 26, 2016, ACM, pp. 1-7.

Figuli et al., "Plausability-Driven Fault Detection in String Termination Logic for Fast Exact Substring Match", U.S. Appl. No. 16/567,356, filed Sep. 11, 2019.

Figuli et al., "Plausability-Driven Fault Detection in Result Logic and Condition Codes for Fast Exact Substring Match", U.S. Appl. No. 16/567,398, filed Sep. 11, 2019.

List of IBM Patents or Patent Application Treated as Related, Signed Feb. 4, 2020, 2 pages.

\* cited by examiner

NON-OVERLAPPING SUBSTRING DETECTION WITHIN A DATA ELEMENT STRING

BACKGROUND

The present disclosure relates to the field of digital computer systems, and more specifically, to a method, logic device, and computer program product for rapid substring detection within a data element string.

Digitally represented text is often stored within a data storage device as strings of binary-encoded characters. Examples of widely accepted and used character encoding standards for electronically stored text include the American Standard Code for Information Interchange (ASCII) and the Unicode Transformation Format (UTF). Various versions and derivatives of these standards can include a range of bits per character between 7 and 32. A common text processing task performed by computers is a substring search or substring match that is used to identify instances of a "reference" string of characters within a larger "target" string of characters. There is an ever-increasing pool of digitally stored textual information, particularly non-structured human-readable information, available for use with computers and other electronic devices. In order to efficiently and effectively process this pool of digitally stored textual information there is a need for more rapid location and matching of information such as character substrings from within larger strings of binary-encoded characters.

SUMMARY

Embodiments may be directed towards a method, a logic device, and a computer program product for rapid detection of a substring within a data element string. Embodiments of the present disclosure can be freely combined with each other if they are not mutually exclusive.

Embodiments may be directed towards a method for determining, within a string of data elements, a number of non-overlapping instances of a substring. The method can include partitioning and distributing the string of data elements to an ordered list of segments having equal lengths that are at least equal to a length "L," and detecting, by sequentially comparing the substring with each segment of the ordered list of segments, a substring match within a target segment of the ordered list of segments. The method can also include determining, in response to detecting the substring match, that the target segment contains additional data elements and generating, in response to determining that the target segment contains additional data elements, from the target segment, a new segment by clearing L−1 data elements following a position of the substring match in the target segment. The method can also include detecting an additional substring match by comparing, in response to the generation of the new segment, the substring with the new segment.

Embodiments may also be directed towards a logic device for determining, within a string of data elements, a number of non-overlapping instances of a substring. The logic device can include a comparator matrix including diagonal AND chains configured to perform substring matching and including correction logic to suppress partial substring matches and a substring input register configured to receive and contain the substring. The logic device can also include a string input register configured to receive and contain the string of data elements and a filtered bitmask output register configured to receive and contain a filtered bitmask. The logic device can include a filter logic configured to suppress a first substring match that overlaps a second substring match. The logic device can be configured to partition and distribute the string of data elements, contained in the string input register, to an ordered list of segments having equal lengths that are at least equal to a length "L." The logic device can be configured to detect, by sequentially comparing, with the comparator matrix, the substring, contained in the substring input register, with each segment of the ordered list of segments, a substring match within a target segment of the ordered list of segments. The logic device can be configured to determine, in response to detecting, with the comparator matrix, the substring match, that the target segment contains additional data elements and generate, in response to determining that the target segment contains additional data elements, from the target segment, a new segment by clearing L−1 data elements following a position of the substring, contained in the substring input register, match in the target segment. The logic device can be configured to detect an additional substring match by comparing, with the comparator matrix, in response to generation of the new segment, the substring with the new segment.

Embodiments may be directed towards a computer program product for determining, within a string of data elements, a number of non-overlapping instances of a substring of a length "L." The computer program product includes a computer-readable storage medium having program instructions embodied therewith, wherein the computer-readable storage medium does not comprise a transitory signal per se. The program instructions are executable by a computer to cause the computer to perform a method. The method can include partitioning and distributing the string of data elements to an ordered list of segments having equal lengths that are at least equal to a length "L" and detecting, by sequentially comparing the substring with each segment of the ordered list of segments, a sub string match within a target segment of the ordered list of segments. The method can also include determining, in response to detecting the substring match, that the target segment contains additional data elements. The method can also include generating, in response to determining that the target segment contains additional data elements, from the target segment, a new segment by clearing L−1 data elements following a position of the substring match in the target segment. The method can also include detecting an additional substring match by comparing, in response to generation of the new segment, the substring with the new segment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
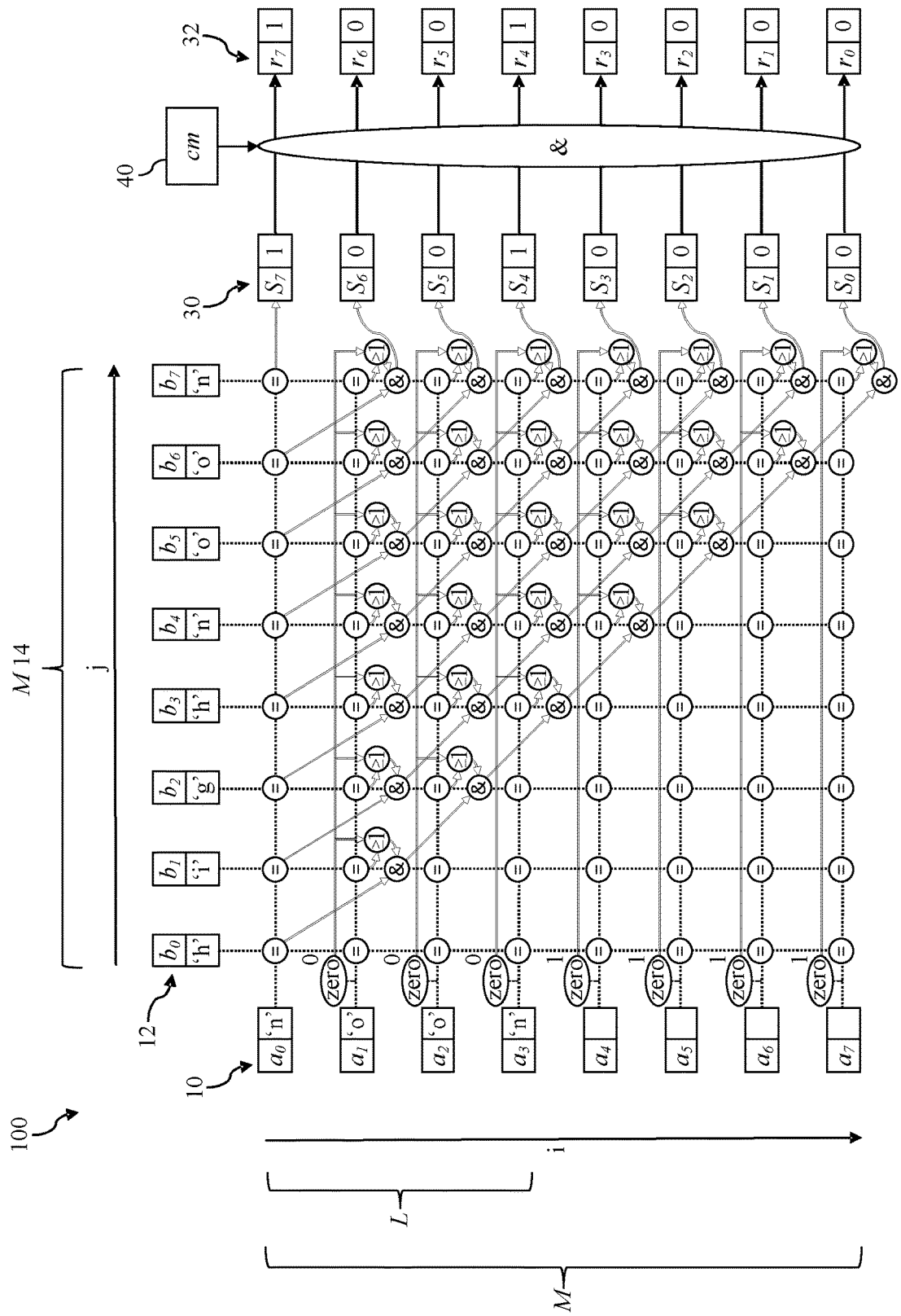
FIG. 1 is a block diagram that depicts a comparator matrix including diagonal AND chains for substring matching and correction logic for suppression of partial substring matches, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The descriptions of embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

Embodiments of the present disclosure generally relate to data processing systems, and in particular, to a method, a logic device and a computer program product for determining a number of non-overlapping instances of a substring of a length "L" within a string of data elements. Embodiments further relate to a computer program product for determining a number of non-overlapping instances of a substring of a length within a string of data elements.

Some embodiments can include a method for determining a number of non-overlapping instances of a substring of a length "L" within a string of data elements. The string is partitioned and distributed to an ordered list of segments of equal length that is greater or equal to the length L, where the length L is the number of data elements, e.g., bits or characters, in the substring. The substring is then compared sequentially with each segment in the order of the list to detect a substring match within the segment. When no substring match is found then a number of non-overlapping instances of the substring within the string is returned as a logical "0." According to embodiments, in such a comparison, the individual elements in a segment are compared concurrently by a hardware-based vector engine.

The embodiments described herein can include the use of particular technologies only by way of example, for ease of understanding of the description. Embodiments can be useful for determining, in response to detecting a match, if the target segment with the substring match contains additional data elements. If the target segment with the substring match contains additional data elements, embodiments can generate a new segment from the target segment by clearing L−1 data elements following the data element position of the match. Embodiments can, in response to a new segment being generated, compare the substring with the new segment to detect an additional substring match.

Substring search algorithms that are implemented in software and that use a character-by-character comparison method, such as a "naïve" algorithm, can be accelerated through the use of suitable vector or Single Instruction Multiple Data (SIMD) hardware. According to embodiments, vector or SIMD hardware can implement, through special-purpose hardware functions, dedicated string search/detection instructions. Such dedicated string detection can be useful in simultaneously comparing several characters of a string, represented as a vector, through the use a single operation. The use of such special-purpose hardware functions and instructions can result in significant acceleration of substring searches. A non-overlapping substring match as a particular substring problem may be accelerated through the use of such hardware vector engines. Non-overlapping substring detection can have particular significance in the fields of lossless data compression, data analytics for large datasets, i.e., "big data," DNA string analysis, pattern-based event triggers and various other applications that include counting the number of instances of a substring that frequently occurs within a longer character string.

Existing software-implemented solutions may need to execute multiple operations and branches, which can be both tedious and time-consuming. Extensive collections of software functions are available in programming or mark-up languages to count the number of substring instances. Yet, there remains a need for hardware support to filter out the overlapping substrings, a task which is often performed solely through software operations. Hardware dedicated to string detection can provide significant speed advantages over software-implemented substring detection methods. According to embodiments, a hardware vector engine architecture that detects all instances of a substring within a string segment and suppresses the overlapping matches, can be useful in providing significantly increased performance for such operations.

A method according to embodiments builds upon a comparator matrix having diagonal AND chains and correction logic used to suppress partial substring matches from the main result. This logic structure is able to detect, in only one comparison cycle, a full substring within short target strings that are shorter than a vector length. Filter logic, in conjunction with the generation and application of a moving mask, within the length of the search string, can be used to filter out any overlapping substring matches found within the string. According to embodiments, filter logic may be applied to the result that, from left to right, gradually forces the L−1 bits, after a match to a logical "0," where L is the length of the substring.

Benefits of using filter logic can include faster solving of the non-overlapping substring match problem and reduced software overhead, relative to other string searching methods and methodologies. Embodiments can provide performance enhancements in application fields that require searching for non-overlapping matches such as data compression, "big data" analytics, DNA string analysis.

As used herein, the term "iteration" can refer to a substring search operation within one segment of a string. The present disclosure builds upon the SIMD vector logic structure for fast ordered compare, as expressed by the following equations:

$$s_j = e(0)(j) \bigwedge \prod_{i=1}^{M-1-j} e(i)(i+j) \bigvee \text{zero}(i)$$

$$r_j = s_j \wedge cm_j$$

with $$e(i)(j) = \begin{cases} 1, & \text{for } a(i) = b(j) \\ 0, & \text{for } a(i) \neq b(j) \end{cases}$$

and $$\text{zero}(i) = \begin{cases} 1, & \text{for } a(i) = 0 \times 00 \text{ (hex)} \\ 0, & \text{for } a(i) \neq 0 \times 00 \text{ (hex)} \end{cases}$$

Therein, "a" and "b" are vectors of characters, i.e., strings of data elements, representing the substring and the string respectively. "M" is the length in character counts of the a and b vectors. The bit-vector "S" is an intermediate anticipated substring match result for the current segment, and "cm" is a correction mask used to suppress partial matches. The bit-vector "r" is the exact result of full matches for the current segment.

FIG. 1 depicts a comparator matrix 100 with diagonal AND chains for substring matching, and correction logic 40 to suppress partial matches, according to embodiments. The vectors a and b represent the substring 10 and the string 12, respectively, in a segment length. The bit-vector S is represented by the first result bitmask 30 and the bit-vector r is represented by the second result bitmask 32. The correction logic 40 corresponds to the correction mask cm.

According to embodiments, the method for determining a number of non-overlapping instances of a substring 10 of a length L within a string 12 of data elements, the string 12 is partitioned and distributed to an ordered list of segments 14 each having a length equal or greater than the length "L."

The length L of the substring as depicted in FIG. 1, indicates the characters "noon" in the substring 10. The length M of the vectors a and b is also depicted in FIG. 1. The substring 10 is then compared sequentially with each segment 14 in the order of the list, to detect a substring match 20, FIG. 4, within the segment 14. The definition of the segment 14 is depicted in FIG. 1 as being the length of the string 12.

The method includes, in response to detecting a substring match 20, determining if the segment 14 with the substring match 20 contains additional data elements. If the substring match 20 contains additional data elements, a new segment from the target segment 14 is generated by clearing L−1 data elements following the data element position of the substring match 20. If a new segment is generated, the substring 10 is compared with the new segment to detect an additional substring match 20.

Detecting a substring 10 within a string 12 can be performed by a bitwise compare operation of the substring 10 and the string 12. For this purpose, trailing logical "0"s of the substring 10 may be populated with a value of a logical "1," for a comparison with the string 12. The equality compare matrix 100, depicted in FIG. 1, can perform the substring search within the current segment 14 in the upper diagonal's AND chains. For ease of illustration, FIG. 1 shows vector lengths of 8 characters, yet larger vector lengths, e.g., 16, 32, 64 and above, are also possible. The result vector S is the first result bitmask 30 and the result vector r is a second result bitmask 32 that indicates full matches within the current segment 14.

Figure 4:
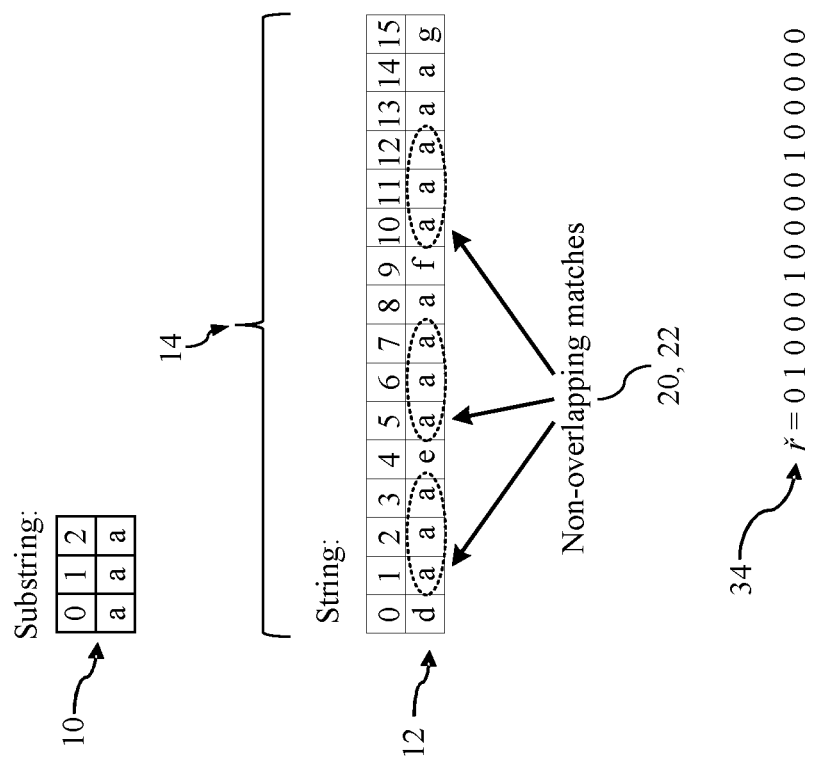
FIG. 4 depicts the results of a substring search with non-overlapping matches following the removal of overlapping matches through filtering, according to embodiments consistent with the figures.

The method also includes determining a first result bitmask 30 that indicates an intermediate anticipated substring match for the current segment 14, determining a second result bitmask 32 that indicates a full match 20 for the current segment 14, and, determining a filtered result bitmask 34 that indicates a non-overlapping match 22, FIG. 4, of the string 12.

The first result bitmask 30 may be determined by applying sequential logical AND operations in the upper diagonals of the comparator matrix 100 to compare operations of the substring 10 and the string 12. The first result bitmask 30 may be corrected by a correction mask 40, suppressing partial substring matches 22. The second result bitmask 32 is determined by applying the correction mask 40 through a logical AND operation, to the first result bitmask 30. Hereby the correction mask 40 can invalidate a number of trailing result bits of the first result bitmask 30, wherein the number is the length of the substring 10 minus one. If, for example, the substring 10 has a length of L=4 bits, then a real full match might occur in the fourth trailing bit, but not from the third trailing bit onward. In this case the trailing three bits, equal to L−1, would be invalidated.

In some embodiments, the comparator matrix 100 may be implemented in a hardware device. Thus a dedicated logic device 200, FIG. 5, may be used for detecting substrings 10 within a string 12 of data elements. The logic device 200 may comprise at least a comparator matrix 100 with diagonal AND chains for substring match and correction logic to suppress partial substring matches, an input register for the substring 10, an input register for the string 12, an output register for a filtered bitmask 34, and filter logic 110, FIG. 3, for performing the substring search method.

Figure 2:
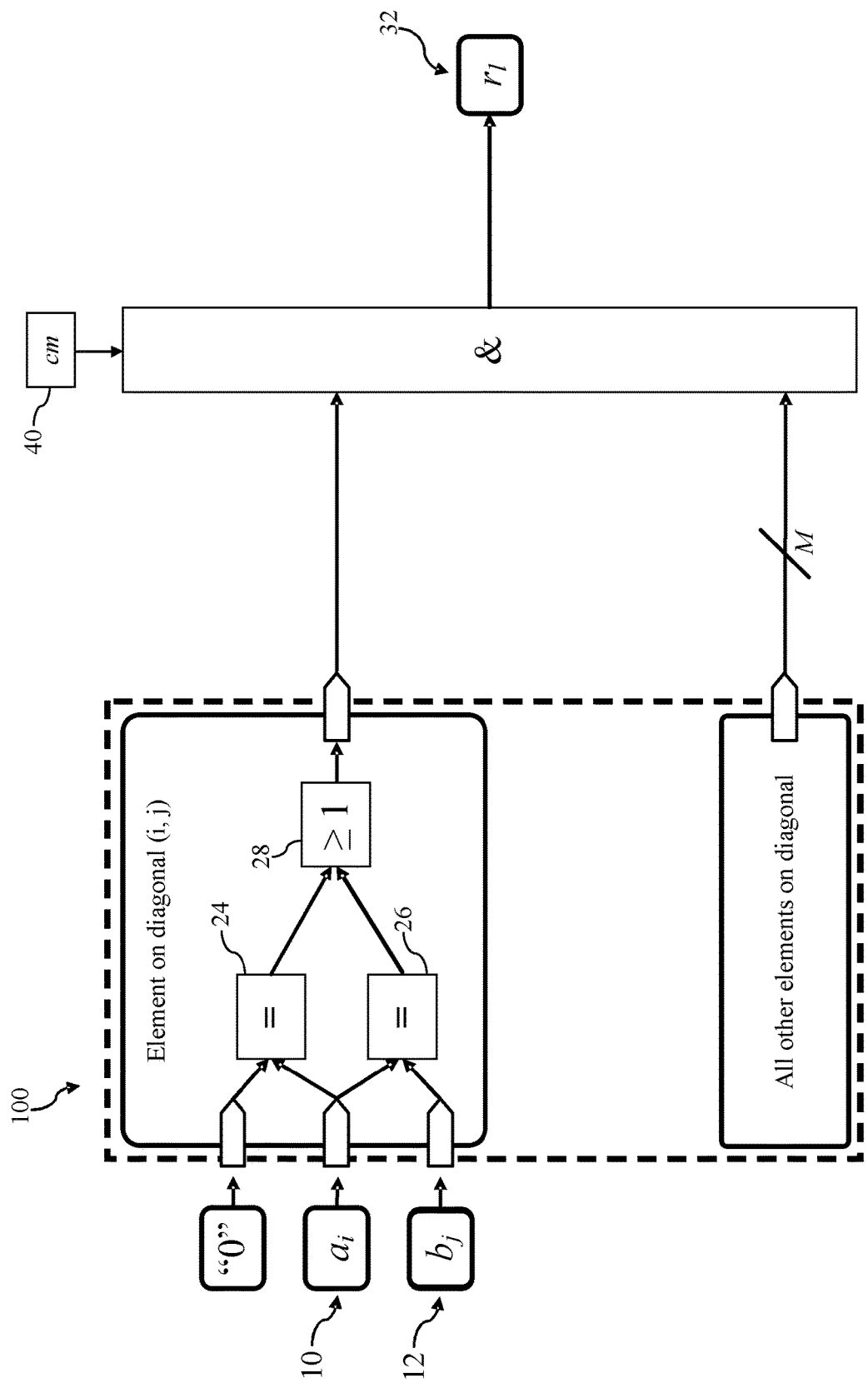
FIG. 2 is a block diagram that depicts logical operations of the comparator matrix, according to embodiments consistent with the figures.

FIG. 2 is a block diagram that depicts logical operations performed by the comparator matrix 100, according to embodiments. A substring element $a_i$ 10, on a diagonal (i, j) of the comparator matrix 100 is first checked for a logical "0" value by an equality comparator 24. If substring element $a_i$ is a logical "0," a logical "1" value is driven to an input of comparator 28, which is implemented as an "OR" gate. The substring element $a_i$ 10 and the string element $b_j$ 12 are checked for equality by the comparator 26, and the result is driven to an input of the OR gate 28, which checks if the sum of both values is greater than or equal to one. The result of this compare operation is driven to the correction mask 40. All other elements on a diagonal of the comparator matrix 100 are driven to the correction mask 40 having a width "M" bits, the length of the segment 14. After the operation of the correction mask 40, the second result bitmask 32 results in an element n.

Figure 3:
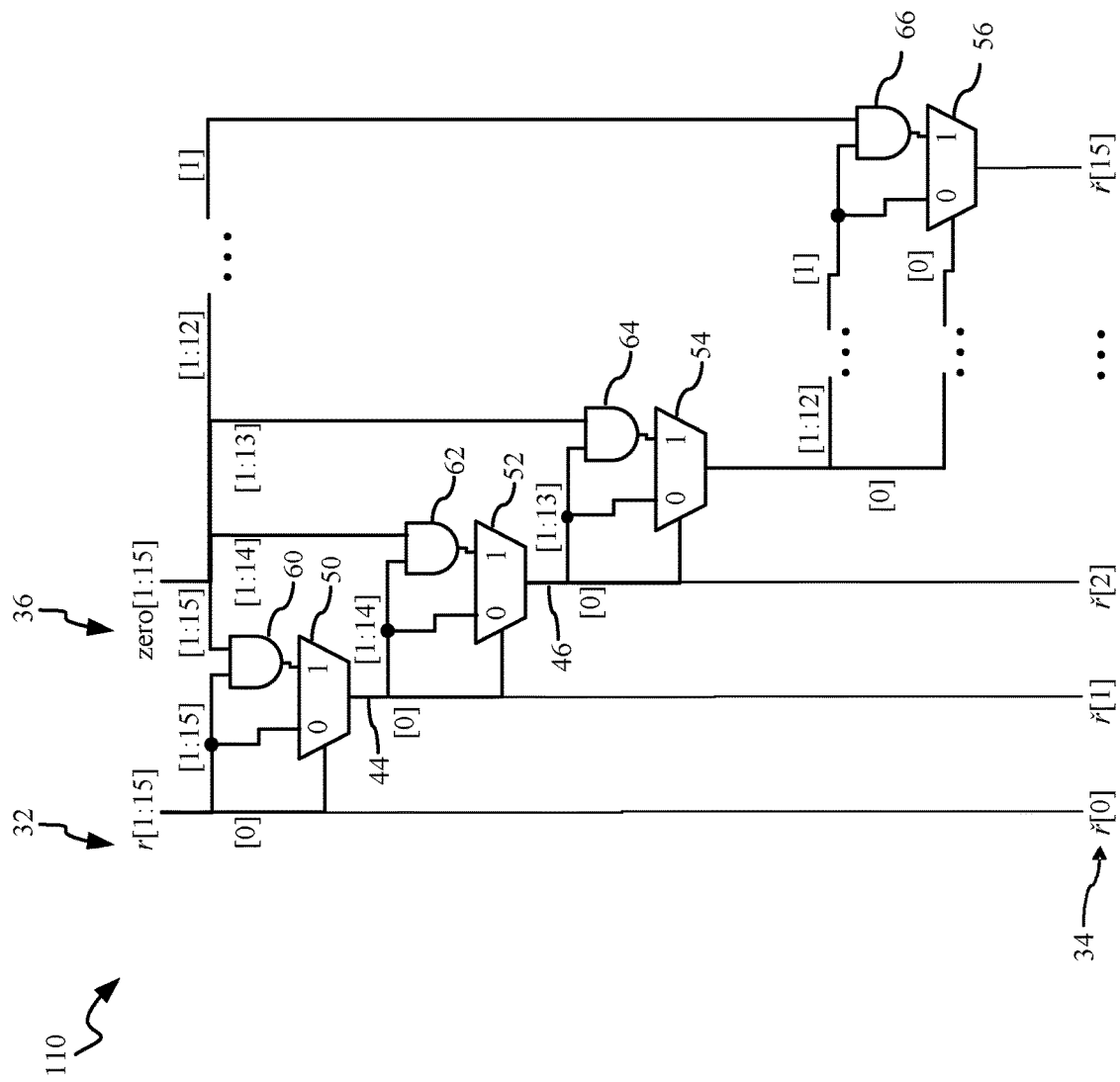
FIG. 3 is a logic block diagram that depicts filter logic for suppressing overlapping substring matches, according to embodiments consistent with the figures.

FIG. 3 is a logic block diagram that depicts filter logic 110, which is applied to the second result vector r 32 for suppressing overlapping substring matches, according to embodiments. Inputs to the filter logic 110 include the second result bitmask r 32 and a zero vector 36. The second result bitmask r 32 and the zero vector 36 are of a length "M" bits.

According to embodiments, the first bit of the second result bitmask r 32 controls the select input of a multiplexer (MUX) 50. If r[0] is a logical "0," then the remaining M−1 bits of the second result bitmask r 32 are selected and driven to the output of the MUX 50. However, if r[0] is a logical "1," then a conjunction, i.e., logical "AND," of the remaining M−1 bits of the second result bitmask r 32 with the last M−1 bits of the zero vector 36 is selected via the AND gate 60. The zero vector 36 contains a logical "1" where the encoded substring vector a 10 contains "0x00," and in all other places, i.e., bits, contains a logical "0." For purposes of discussion, it is assumed that the substring a 10 is null terminated, which means that the first L places in the zero vector 36 are a logical "0" and the remaining places a logical "1."

The output of the MUX 50 is an intermediate vector int0 44 with a length of M−1 bits. MUX 50 ensures that in case there is a substring match in the first bit of the second result bitmask r 32, the following L−1 bits are forced to a logical "0" and all other bits will retain their current value. The first bit of the intermediate vector int0 44 then controls a second MUX 52, which selects either the remaining M−2 bits of int0 44 if int0[0] is a logical "0," or a conjunction of the remaining M−2 bits of int0 44 with the remaining M−2 bits of the zero vector 36 if int0[0] is a logical "1."

The output of the second MUX 52 is another intermediate vector int1 46 of length M−2. This procedure is gradually repeated for the remaining bits with the additional MUX devices 54, 56 and additional AND gates 62, 64 and 66.

The first bit of the new filtered result ř 34 corresponds to the first bit of the unfiltered result r 32. The second bit of ř 34 corresponds to the first bit of the first intermediate vector int0 44. The third bit of ř corresponds to the first bit of int1 46, and so on.

The filtered result bitmask 34 is thus determined by the bitwise output of multiplexers 50, 52, 54 and 56 of the filter logic 110. In case the first bit of the second result bitmask 32 is a logical "1," the following L−1 output bits of multiplexers 50, 52, 54 and 56 are set to a logical "0." In case the first output bits of multiplexers 50, 52 and 54 are one, the following L−1 bits of the output of a following multiplexer 52, 54 and 56 are set to a logical "0."

A generalized formulation of this technique is given in the following pseudo-code:

```
int(0)(0 to M-2) <= r(1 TO M-1) WHEN r(0)='0'
else r(1 TO M-1) AND zero(1 TO M-1);
FOR j IN 1 TO M-2 GENERATE
int(j)(0 TO M-2-j) <= int(j-1)(1 TO M-1-j)
WHEN int(j-1)(0)='0'
else int(j-1)(1 TO M-1-j) AND zero(1 TO M-1-j);
END GENERATE;
ř(0) <= r(0);
FOR j IN 1 TO M-1 GENERATE
ř(j) <= int(j-1)(0);
END GENERATE;
```

An appropriate parallel data-processing system can be used to implement the pseudo-code, which may provide string search performance benefits.

The method, according to embodiments, thus searches for the first non-overlapping occurrence of a substring within a string, but without the limitations of the general method, it is also possible to detect the last non-overlapping occurrence of a substring. In some embodiments, the filter logic can also be implemented as a pipelined structure, which may have certain advantages in increasing search/detection throughput rates.

FIG. 4 depicts a substring search having non-overlapping matches following the filtering out of overlapping matches, according to embodiments. FIG. 4 depicts a substring 10 consisting of 3 characters and a string 12 consisting of 16 characters.

Through the use of filter logic, the second result bitmask r 32 can contain overlapping matches, while the new filtered result bitmask ř 34 includes only the non-overlapping matches. According to embodiments, the substring match and filtering out of overlapping matches in a segment of M characters can be performed in a single software operation.

Figure 5:
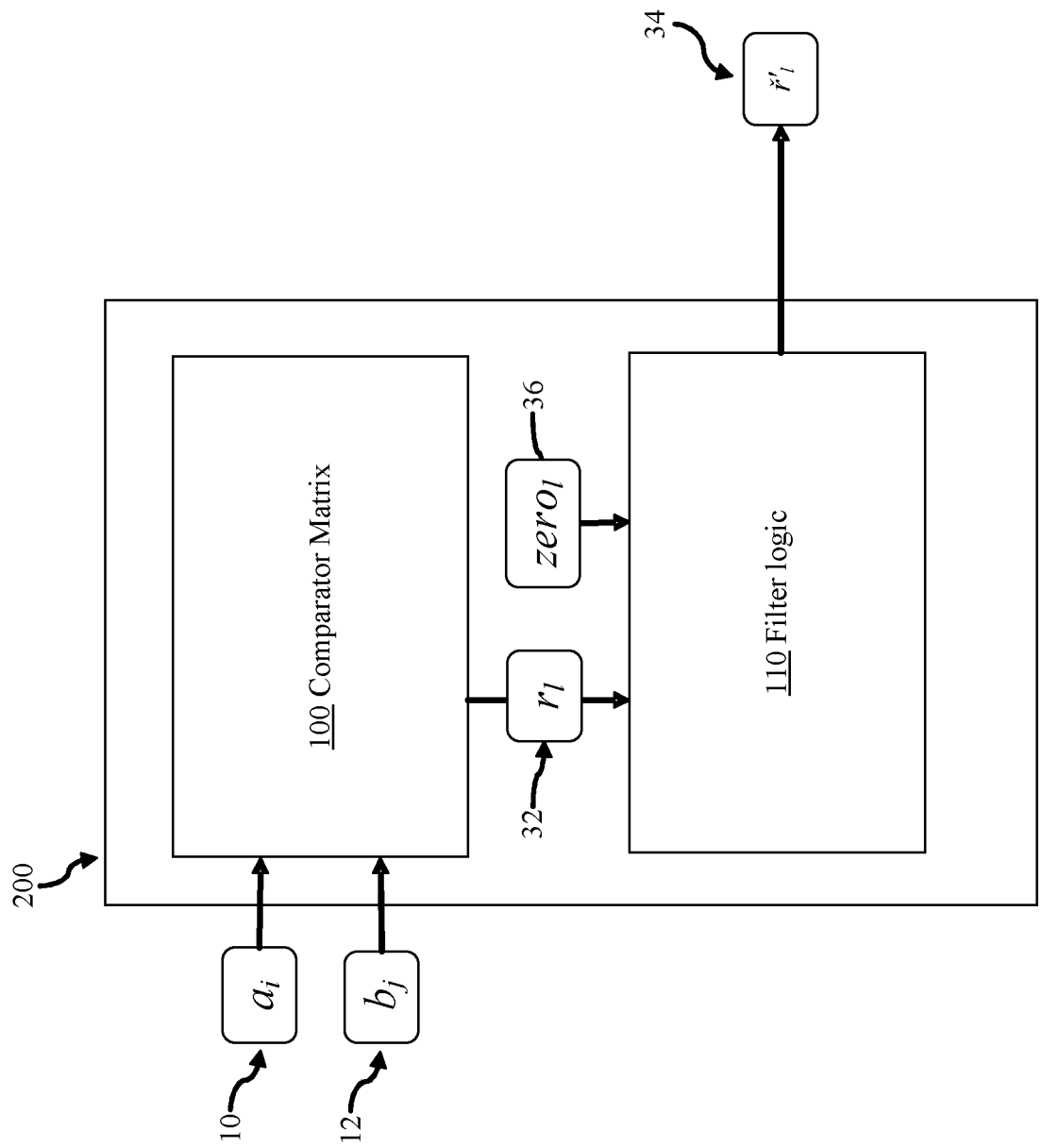
FIG. 5 depicts a logic device for determining a number of non-overlapping instances of a substring within a string of data elements, according to embodiments consistent with the figures.

FIG. 5 depicts a logic device 200 for determining a number of non-overlapping instances of a substring 10 within a string 12 of data elements, according to embodiments.

The logic device 200 includes at least a comparator matrix 100 with diagonal AND chains for substring matching, and correction logic to suppress partial substring matches. The logic device 200 also includes an input register for the substring 10, an input register for the string 12, an output register for a filtered result bitmask 34, and filter logic 110. The logic device 200 can perform the described method for determining a number of non-overlapping instances of a substring 10 within a string 12 of data elements.

The logic device 200 receives the substring 10 and the string 12 as inputs. The search for a substring match is executed in the comparator matrix 100, resulting in the second result bitmask 32 which is subsequently driven to the filter logic 110. The filter logic 110 receives as a second input a zero vector 36. After filtering the second result bitmask 32, a filtered result bitmask 34 results in an output vector 36 as a final result of the non-overlapping matches of the substring 10 within the string 12.

According to embodiments, a substring vector engine can suppress overlapping substring matches through the use of hardware functions, which can provide advantages over other types of substring searching methods. A substring vector engine can, with a single operation, find all substring matches within a string, and return a bit-mask with all non-overlapping instances of the substring within the target string segment that fits in a vector register, typically 16 characters in a 128-bit register. Software can be used to exploit this vector engine to solve the problem of identifying non-overlapping substring matches more rapidly than certain other search methods, as software in conjunction with the vector engine can perform this search with significantly less operations and branches. Embodiments can thereby result in significant acceleration of workloads in application areas such as data compression, large dataset, i.e., "big data" analytics, DNA string analysis and various other applications that count the instances of non-overlapping substrings within a string.

Figure 6:
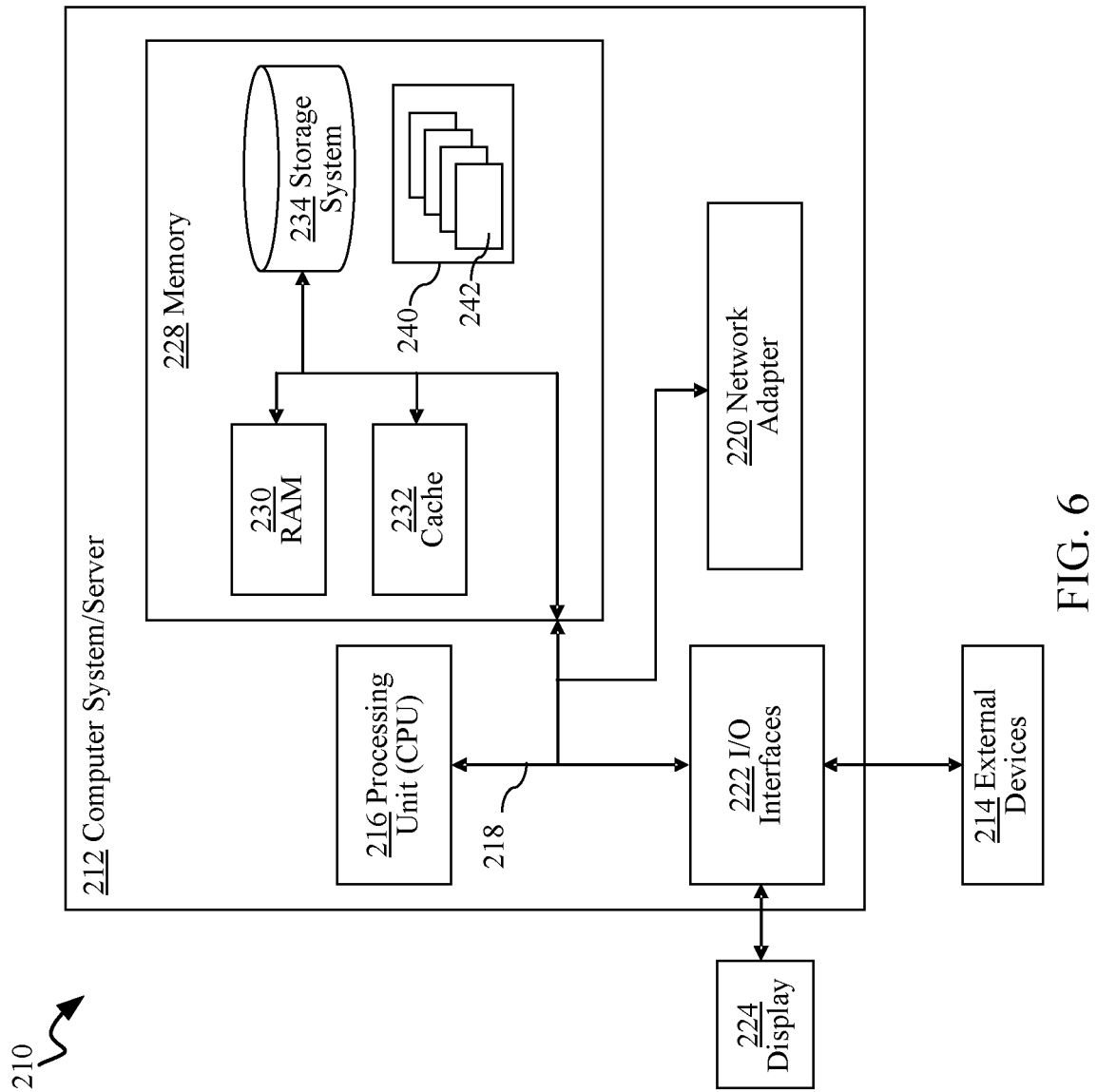
FIG. 6 depicts an example data processing system that can be used to execute a substring search, according to embodiments consistent with the figures.

Referring now to FIG. 6, a schematic of an example of a data processing system 210 is shown. Data processing system 210 is only one example of a suitable data processing system and is not intended to suggest any limitation as to the scope of use or functionality of embodiments described herein. Regardless, data processing system 210 is capable of being implemented and/or performing any of the functionality set forth herein above.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. A non-limiting list of such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer-readable media. Such media may be any available media that is accessible by computer system/server 212, and can include both volatile and non-volatile media, removable and non-removable media.

System memory 228 can include non-transitory computer-readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set, e.g., at least one, of program modules that are configured to carry out the functions of embodiments.

Program/utility 240, having a set of at least one program module(s) 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments as described herein.

Computer system/server 212 may also communicate with one or more external devices 214 such as a keyboard, a pointing device, a display 224, etc.; one or more devices that enable a user to interact with computer system/server 212; and/or any devices, e.g., network card, modem, etc., that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples include, but are not limited to: microcode, device drivers, redundant processing units, external disk drive arrays, redundant array of independent disks (RAID) systems, tape drives, and data archival storage systems, etc.

Embodiments of the present disclosure may be a system, a method, and/or a computer program product. The computer program product may include a non-transitory computer-readable storage medium or media having computer-readable program instructions thereon for causing a processor to carry out aspects of the present disclosure.

The computer-readable storage medium can be a tangible device that can retain and store instructions for use by an instruction execution device. The computer-readable storage medium may include, for example, but is not limited to, an electronic storage device, a magnetic storage device, an optical storage device, an electromagnetic storage device, a semiconductor storage device, or any suitable combination of the above. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure. In some embodiments, electronic circuitry used in the fabrication of a logic device to implement aspects of the present disclosure can include application-specific integrated circuits (ASICs) such as gate-array chips, or other types of custom or semi-custom integrated circuits (ICs). Such ICs can be fabricated using IC technologies and associated design styles such as complementary metal-oxide semiconductor (CMOS) and silicon on insulator (SOI).

Aspects of the present disclosure are described herein with reference to flowchart illustrations and/or block diagrams of methods, apparatus, i.e., systems, and computer program products according to embodiments. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a count of non-overlapping instances of a substring present within a string of data elements, the method comprising:
   partitioning and distributing the string of data elements to an ordered list of segments having equal lengths that are at least equal to a length "L";
   detecting, by sequentially comparing the substring with each segment of the ordered list of segments, a substring match within a target segment of the ordered list of segments;
   determining, in response to detecting the substring match, that the target segment contains additional data elements;
   generating, in response to determining that the target segment contains additional data elements, from the target segment, a new segment by clearing L−1 data elements following a position of the substring match in the target segment;
   detecting an additional substring match by comparing, in response to the generation of the new segment, the substring with the new segment; and
   providing the count of non-overlapping instances of the substring present within the string of data elements.

2. The method of claim 1, further comprising suppressing, with filter logic, a first substring match that overlaps a second substring match.

3. The method of claim 1, further comprising using filter logic to:
   determine a first result bitmask that indicates, for a current segment of the ordered list of segments, an intermediate anticipated substring match;
   determine a second result bitmask that indicates, for the current segment of the ordered list of segments, a full substring match; and
   determine a filtered result bitmask that indicates a non-overlapping substring match of the string.

4. The method of claim 3, further comprising using the filter logic to:
   control, in response to a first bit of the second result bitmask, a select input of a multiplexer of the filter logic;
   select, to an output of the multiplexer of the filter logic, in response to a first bit of the second result bitmask being a logical "0," a set of remaining L−1 bits of the second result bitmask;
   select, to the output of the multiplexer, in response to the first bit of the second result bitmask being a logical "1," a conjunction of the set of remaining L−1 bits with a set of last L−1 bits of a zero vector; and
   control, with the output of the multiplexer, another select input of a following multiplexer.

5. The method of claim 3, further comprising:
controlling, by a first bit of an output of a previous multiplexer, a select input of a multiplexer of the filter logic;
selecting, in response to the first bit of the output of the previous multiplexer being a logical "0," a set of remaining L−1 bits to drive an output of the multiplexer;
selecting, in response to the first bit being a logical "1," a conjunction of the set of remaining L−1 bits with the set of last L−1 bits of a zero vector to drive the output of the multiplexer; and
controlling, with the output of the multiplexer, another select input of a following multiplexer.

6. The method of claim 3, wherein an output of a multiplexer is configured to control a select input of a following multiplexer.

7. The method of claim 3, wherein the filtered result bitmask is determined by a bitwise output of a multiplexer of the filter logic.

8. The method of claim 3, wherein, in response to a first bit of the second result bitmask being a logical "1," setting to a logical "0" a set of following L−1 bits of an output of a multiplexer.

9. The method of claim 3, wherein, in response to a first bit of an output of a multiplexer being a logical "1," setting to a logical "0" a set of following L−1 bits of an output of a following multiplexer.

10. The method of claim 3, wherein the first result bitmask has a reversed bit order for propagating to the second result bitmask.

11. The method of claim 3, wherein the first result bitmask is determined by applying sequential logical AND operations in diagonals of a comparator matrix to compare operations of the substring and the string.

12. The method of claim 3, wherein the first result bitmask is corrected by a correction mask that suppresses partial substring matches.

13. The method of claim 12, wherein the correction mask invalidates a number, equal to a length L of the substring minus one, of trailing result bits of the first result bitmask.

14. The method of claim 12, wherein the second result bitmask is determined by applying the correction mask by a logical AND operation to the first result bitmask.

15. The method of claim 1, further comprising detecting, by a bitwise compare operation of the substring and the string, a substring within a string.

16. The method of claim 1, wherein detecting an additional substring match includes overwriting trailing logical "0"s of the substring with logical "1" values prior to a comparison of the substring with the string.

17. A logic device configured to determine a count of non-overlapping instances of a substring present within a string of data elements, the logic device comprising:
a comparator matrix including:
diagonal logical AND chains configured to perform substring matching; and
correction logic to suppress partial substring matches; and
a substring input register configured to receive and contain the substring;
a string input register configured to receive and contain the string of data elements;
a filtered bitmask output register configured to receive and contain a filtered bitmask; and
a filter logic configured to suppress a first substring match that overlaps with a second substring match;
wherein the logic device is configured to:
partition and distribute the string of data elements contained in the string input register to an ordered list of segments having equal lengths that are at least equal to a length "L";
detect a substring match within a target segment of the ordered list of segments by sequentially comparing, with the comparator matrix, the substring contained in the substring input register with each segment of the ordered list of segments;
determine, in response to the detecting with the comparator matrix of the substring match, that the target segment contains additional data elements;
generate from the target segment, in response to determining that the target segment contains additional data elements, a new segment by clearing L−1 data elements following a position of the substring match, contained in the substring input register, in the target segment;
detect an additional substring match by comparing, with the comparator matrix, in response to generation of the new segment, the substring with the new segment; and
generate, with the filter logic, an output vector that represents the count of non-overlapping instances of the substring present within the string of data elements.

18. A computer program product for determining a count of non-overlapping instances of a substring of a length L present within a string of data elements, the computer program product comprising a computer-readable storage medium having program instructions embodied therewith, wherein the computer-readable storage medium does not comprise a transitory signal per se, the program instructions executable by a computer to cause the computer to perform a method comprising:
partitioning and distributing the string of data elements to an ordered list of segments having equal lengths that are at least equal to a length "L";
detecting, by sequentially comparing the substring with each segment of the ordered list of segments, a substring match within a target segment of the ordered list of segments;
determining, in response to detecting the substring match, that the target segment contains additional data elements;
generating, in response to determining that the target segment contains additional data elements, from the target segment, a new segment by clearing L−1 data elements following a position of the substring match in the target segment; and
detecting an additional substring match by comparing, in response to generation of the new segment, the substring with the new segment; and
providing the count of non-overlapping instances of the substring present within the string of data elements.

19. The computer program product of claim 18, wherein the method further comprises suppressing, with filter logic, a first substring match that overlaps a second substring match.

20. The computer program product of claim 18, wherein the method further comprises using filter logic to:
determine a first result bitmask that indicates, for a current segment of the ordered list of segments, an intermediate anticipated substring match;
determine a second result bitmask that indicates, for the current segment of the ordered list of segments, a full substring match; and determine a filtered result bitmask that indicates a non-overlapping substring match of the string.

\* \* \* \* \*